Oct. 21, 1924.  1,512,596
C. M. HAMSHAW
AGRICULTURE IMPLEMENT
Original Filed Dec. 9, 1918   3 Sheets-Sheet 1

INVENTOR
Clarence M. Hamshaw
BY
Frank Warren
ATTORNEY

Oct. 21, 1924.
C. M. HAMSHAW
1,512,596
AGRICULTURE IMPLEMENT
Original Filed Dec. 9, 1918      3 Sheets-Sheet 3
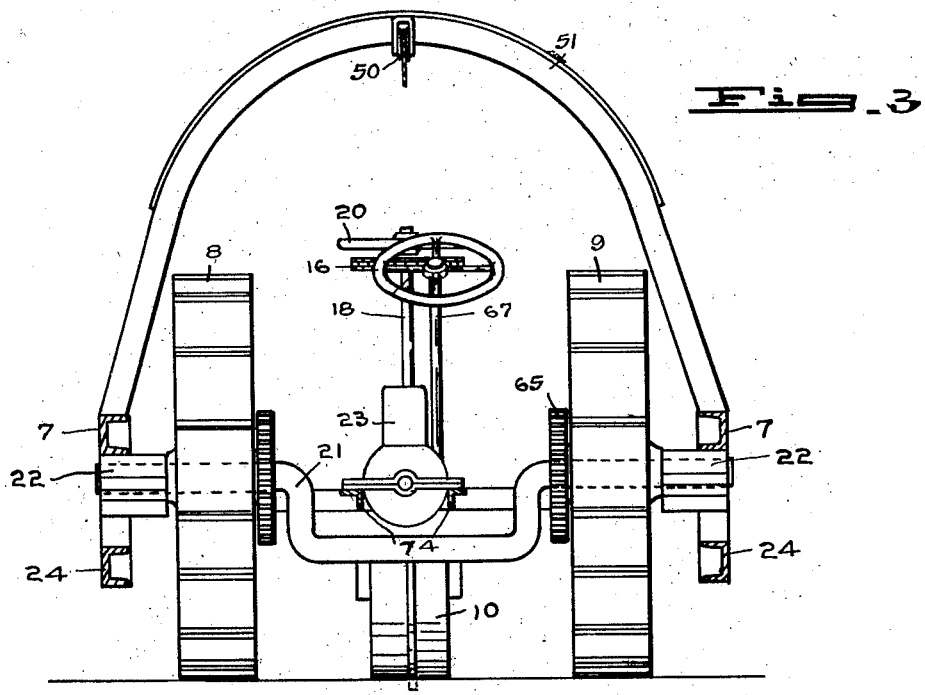
Fig. 3
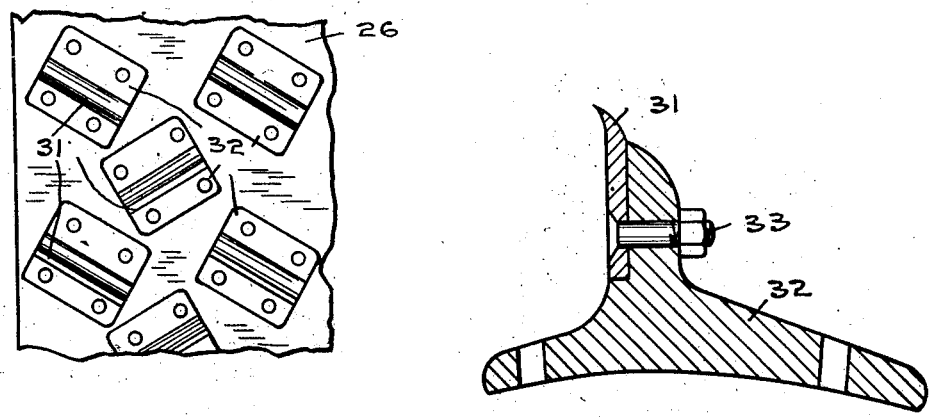
Fig. 4
Fig. 5
INVENTOR
CLARENCE M. HAMSHAW
BY
Frank Warren
ATTORNEY Patented Oct. 21, 1924.

1,512,596

UNITED STATES PATENT OFFICE.

CLARENCE M. HAMSHAW, OF SEATTLE, WASHINGTON.

AGRICULTURE IMPLEMENT.

Application filed December 9, 1918, Serial No. 265,997. Renewed May 5, 1923.

*To all whom it may concern:*

Be it known that I, CLARENCE M. HAMSHAW, a citizen of the United States, residing at Seattle, in the county of King and State of Washington, have invented a certain new and useful Improvement in Agriculture Implements, of which the following is a specification.

My invention relates to improvements in agricultural implements of the tractor type that are adapted for cultivating the surface of the ground, preparing a seed bed and planting the seed and the object of my invention is to provide an agricultural implement simple in its form of construction that embodies a tractor frame mounted on wheels and provided at its rear end with a power driven drum on whose periphery are disposed knives for cultivating the soil, the drum being arranged to be driven in the same direction as the tractor wheels so that the rotation of the drum will tend to move the tractor frame forwardly. A further object is to suspend the soil cutting drum so that it may be raised or lowered to vary its depth of cut or to raise such drum clear of the ground. A still further object of my invention is to provide means for leveling and breaking the soil and arresting the stubble and trash that is thrown rearwardly by the cutting drum, such means comprising a plurality of upright spaced pipes that are disposed slightly to the rear of the cutting drum and are connected with a hopper so that they may serve as seed conduits and means for breaking and leveling the soil at the same time. Other and more specific objects will become apparent from a consideration of the following description and the accompanying drawings.

I accomplish these objects by devices illustrated in the accompanying drawings, wherein—

Fig. 3 is a view partly in section and partly in elevation substantially on broken line 3, 3 of Fig. 1;

Fig. 4 is a fragmentary plan view illustrating the relative positions of the cutting knives on the drum; and Fig. 5 is an enlarged view in cross-section of one of the cutting knives and the mounting therefor.

Figure 1:
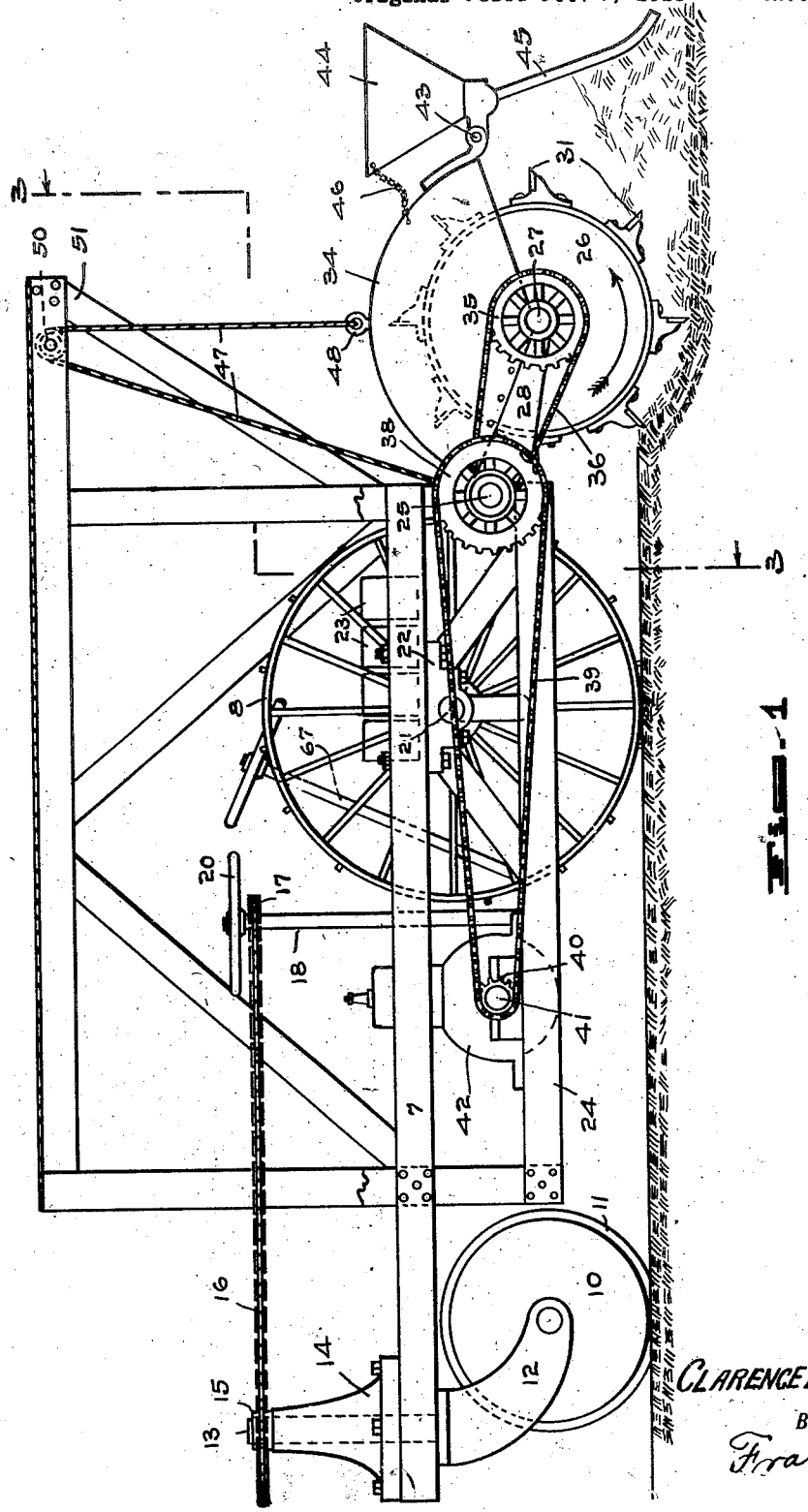
Figure 1 is a view in side elevation of an agricultural implement constructed in accordance with my invention, parts of the tractor top or cover being broken away.

Referring to the drawings, throughout which like reference numerals indicate like parts, the numeral 7 designates a frame that is mounted upon two rear tractor wheels 8 and 9 and a front caster wheel 10. The front caster wheel 10 is provided with a peripheral flange 11 and is mounted within a bracket 12 having a shank 13 that projects upwardly through an elongated bearing member 14 and is provided on its top end with a sprocket wheel 15 about which passes a sprocket chain 16 that extends rearwardly and around a smaller sprocket wheel 17 on a steering post 18 which post 18 is provided on its top end with a suitable steering wheel 20.

The wheels 8 and 9 are mounted for rotation on an axle 21 that is secured to the frame 7 by brackets 22 and that has its central portion bent downwardly, as more clearly shown in Fig. 3, to afford sufficient room for an engine 23 that is rigidly supported upon bars 74 that are connected with the frame 7.

Rigidly secured to the frame 7 and supported at a distance therebelow is a sub-frame 24 upon the rear end of which is carried a rotatably mounted transverse shaft 25.

26 is a cylindrical drum that is provided with an axle shaft 27 which projects from the ends thereof and is connected by links 28 and 30 with the shaft 25, one of the links being disposed at each end of the drum in such manner that the drum is coupled to the tractor frame and adapted to move therewith. The links 28 and 30 serve to maintain a constant distance between the shafts 25 and 27.

The drum 26 is provided at frequent intervals with cutting knives 31 of a form more clearly shown in Fig. 5, that are preferably arranged at an angle and disposed in offset positions with respect to each other, as more clearly shown in Fig. 4.

The cutting knives 31 are secured to knife holders 32 by bolts 33, which knife holders 32 are adapted to be riveted or bolted to the periphery of the drum 26.

The cutting knives 31 are preferably disposed in cylindrical rows around the drum 26, the knives of one row being inclined or angled in one direction and the knives of the next adjacent row being inclined or angled in the opposite direction to prevent ridging of the soil.

The upper side of the drum 26 is covered by a hood 34 of relatively heavy material that may be riveted or otherwise rigidly secured to the links 28 and 30 so that it will serve as a protection for the top of the drum 26 and will prevent such drum from throwing dirt upwardly and forwardly on to the tractor mechanism.

The shaft 27 is provided on each end with a sprocket wheel 35 that is connected by sprocket chains 36 with a sprocket pinion 37 on the shaft 25 and the shaft 25 is provided on each end with a sprocket wheel 38 that is connected by a sprocket chain 39 with a sprocket pinion 40 on the end of a transverse shaft 41 which may be the driving shaft of an engine 42.

By the arrangement just described it will be obvious that when the engine 42 is started the drum 26 may be driven at a greatly reduced speed of rotation in the direction indicated by the arrow in Fig. 1, thus causing it to cut and tear up the soil and throw it rearwardly from such drum 26.

Hinged to the rear portion of the hood 34 by means of pivotal connections 43 is a seed hopper 44 from the lower side of which projects a plurality of pipes 45 that are arranged side by side in relatively closely spaced relation and serve the double function of ground leveling and seed conduit devices. The pipes 45 also act as means for breaking the soil as it is thrown rearwardly by the drum 26.

The pipes 45 are preferably inclined rearwardly as shown in Fig. 1 and are slightly curved at their lower ends to insure that the stubble and trash thrown from the drum 26 will pass thereunder without clogging.

The upper portion of the hopper 44 may be connected with the hood 34 by chains 46 which serve to hold the hopper 44 and pipes 45 in a substantially upright position when the pipes are not in contact with the soil.

The hopper 44 may be provided with any suitable form of seed dispensing mechanism (not shown) whereby seed may be evenly fed through the pipes 45.

From the above description it will be seen that the weight of the hood 34, hopper 44 and pipes 45 are normally carried by the drum 26 thereby insuring sufficient weight to cause the drum 26 to dig into the ground.

For the purpose of limiting the depth of cut of the drum 26 or of raising it entirely out of the ground I have provided a cable 47 which is connected with the hood 34 by means of an eye bolt 48, thence passes upwardly over a pulley 50 in an overhead frame 51, thence downwardly and around a drum 52 that is provided with a pawl 49 by which it may be held in any desired position and is connected by gear wheels 53 and 54 and clutch 55 with the driven shaft 25 in such manner that when the clutch 55 is engaged the drum 52 may be rotated to lift the drum 26 and when the clutch 55 and pawl 49 are disengaged the tension of the cable 47 will be released and the drum 26 will be lowered.

The engine 23 is connected by bevel gears 59 and 56 with a transverse shaft 57 that is provided near its ends with clutches 58 and 60 normally adapted to be held in operatively engaged positions by springs 61. The clutch 58 is connected by a pinion 62, gear wheel 63, pinion 64 and gear wheel 65 with the tractor wheel 9, the pinion 62 being rigidly connected or integral with the cup member of the clutch 58 and the gear wheel 63 and pinion 64 being rigidly connected with each other so that when the cup member 58 of the clutch is driven rotary motion at a greatly reduced speed will be communicated to the tractor wheel 9.

The clutch 60 is connected with the tractor wheel 8 by a train of gears substantially identical with the gears just described that connect the clutch 58 with the tractor wheel 9.

The clutches 58 and 60 are of well known form of construction each embodying a cup element that is integral with or rigidly secured to the adjacent gear pinion and a cone element that is splined upon the shaft 57 and normally held in engagement with the cup element by springs 61.

Figure 2:
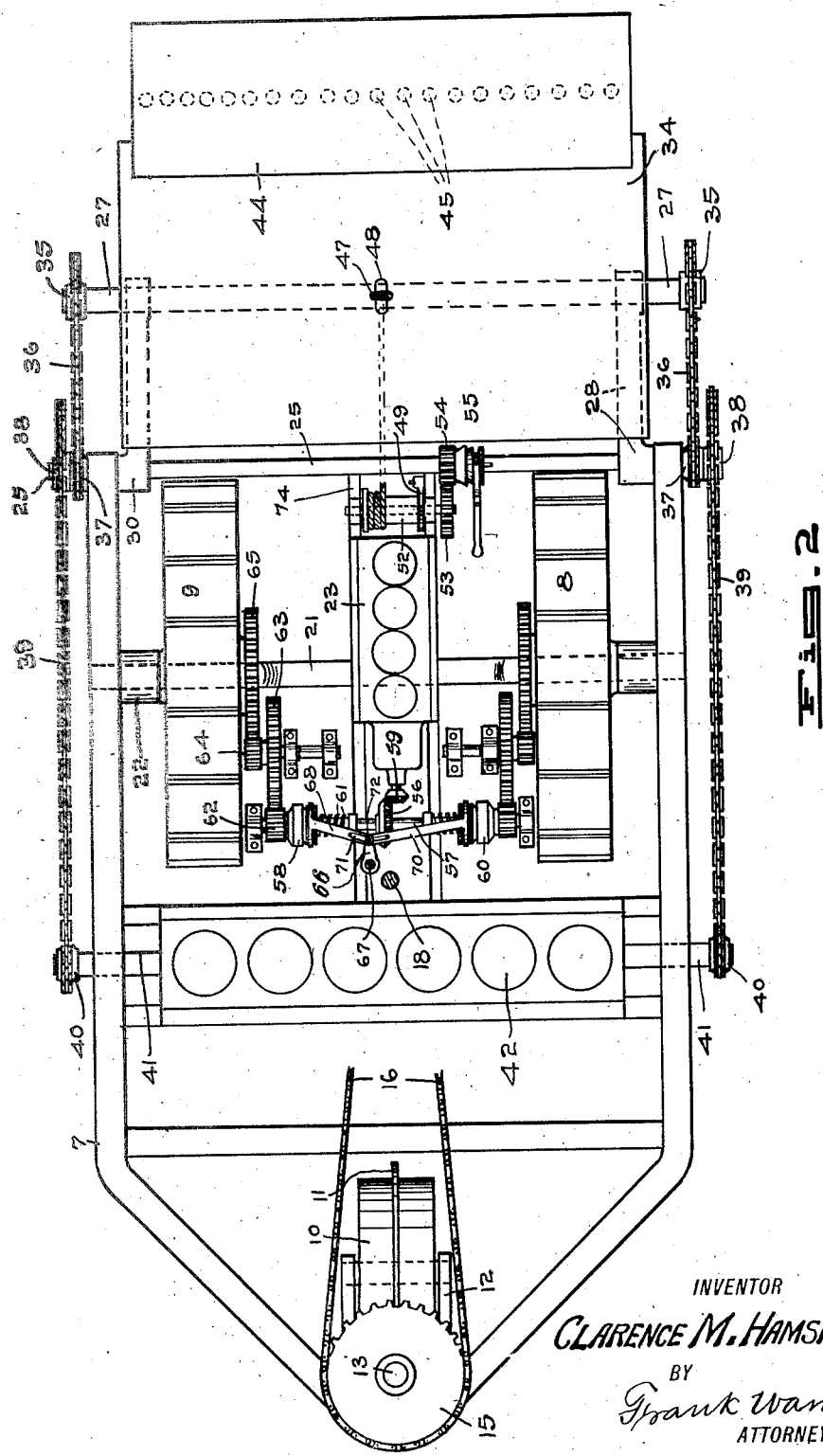
Fig. 2 is a plan view of the same with the cover removed and parts of the steering mechanism broken away to reveal certain other parts.

The clutches 58 and 60 are connected with a lever arm 66 on the lower end of a steering post 67 by links 68 and 70 which links are each provided with slots 71 that fit over a pin 72 in the end of the lever arm 66 so that when the steering post 67 is turned in a clockwise direction as seen in Fig. 2, the clutch 58 will be disengaged, while the clutch 60 will remain in an engaged position and when the steering post 67 is turned in a contraclockwise direction the clutch 60 will be disengaged, while the clutch 58 will remain in an engaged position, thus making it possible to steer the tractor by disengaging the power from either of the tractor wheels 8 or 9.

When gradual turns are to be made the device may be steered by turning the caster wheel 10 but when short sharp turns are to be made one of clutches 58 or 60 will be disengaged thus causing one tractor wheel to lag while the other wheel moves around it and turns the tractor in a very small space.

In operation the engine 23 is used to drive the tractor while the engine 42 is used to drive the drum 26, thus giving the drum 26 and the tractor wheels 8 and 9 independent sources of power so that the speed of travel of the tractor frame and the speed of rotation of the drum 26 may be varied independently of each other.

One of the principal advantages of my invention is that when the drum 26 is in operation and is digging into the soil it will have a tendency to move the tractor frame forward so that only a relative small amount of power need be applied to the tractor wheels.

It is obvious that the engine 23 is used to regulate the speed of the tractor while the drum 26, driven by the engine 42, is plowing the ground, and also is used to drive the tractor when the drum 26 is raised from the ground.

The drum 26 is intended to be rotated at a relatively high rate of speed so that each of the knives 31 will make a relatively thin cut in the soil, thus tending to pulverize the soil and prevent the throwing up of any large clods of earth. The dirt that is thrown rearwardly by the knives 31 will strike against the pipes 35 and be further broken and leveled by such pipes and the stubble and trash that is thrown rearwardly will also be caught by the pipes 35 and leveled down, at the same time seed will be drilled into the prepared seed bed thus completing the planting at a single operation.

The drum 26 may be made to cut at any desired depth and possesses an advantage over a plow due to the fact that the soil is shaved off in relatively thin layers and is broken and thoroughly pulverized thereby forming a seed bed that will be free from clods and that will conserve moisture in the best possible manner.

It is obvious that changes made be made in the form, dimensions and arrangement of parts of my invention without departing from the spirit thereof.

What I claim is:

1. In an agricultural implement of the class described a tractor frame mounted on wheels, means for driving said wheels, a rotatable cylindrical soil cultivator disposed at the rear end of said tractor frame, links connecting the axis of said cylindrical soil cultivator with said frame to permit vertical movement of said soil cultivator, knives on the periphery of said soil cultivator and means independent of said tractor driving means for rotating said soil cultivator and elevating the same.

2. An agricultural implement comprising a frame mounted on two rear tractor wheels and one forward wheel, power actuated driving means connected with said tractor wheels, a rotatable soil cultivator disposed at the rear end of said frame, knives provided on the periphery of said soil cultivator, links connecting the axial shaft of said soil cultivator with said frame to permit vertical movement of said soil cultivator, and independent power actuated means for raising and lowering said cultivator and rotating the same.

3. In an agricultural implement, a frame mounted on two rear tractor wheels and one forward guiding wheel, a rotatable soil cultivator having an axial shaft and disposed at the rear end of said frame, knives provided on the periphery of said soil cultivator, links connecting the axial shaft of said soil cultivator with said frame to permit vertical movement of said soil cultivator, means for raising and lowering said soil cultivator and means for rotating said soil cultivator and operating the raising and lowering means.

In witness whereof, I hereunto subscribe my name this 2nd day of December A. D. 1918.

CLARENCE M. HAMSHAW.